(12) United States Patent
Fly

(10) Patent No.: US 9,440,397 B1
(45) Date of Patent: Sep. 13, 2016

(54) LAYERED 3D PRINTING WITH LOWER VISCOSITY FLUID FILL

(71) Applicant: David E. Fly, Menomonie, WI (US)

(72) Inventor: David E. Fly, Menomonie, WI (US)

( * ) Notice: Subject to any disclaimer, the term of this patent is extended or adjusted under 35 U.S.C. 154(b) by 360 days.

(21) Appl. No.: 14/168,157

(22) Filed: Jan. 30, 2014

(51) Int. Cl.
| | |
|---|---|
| *B22D 23/00* | (2006.01) |
| *B29C 33/56* | (2006.01) |
| *B29C 41/02* | (2006.01) |
| *B29C 41/20* | (2006.01) |
| *B29C 41/22* | (2006.01) |
| *B29C 41/42* | (2006.01) |
| *B29C 70/68* | (2006.01) |
| *B29C 70/70* | (2006.01) |
| *B29C 67/00* | (2006.01) |
| *B29C 33/38* | (2006.01) |

(52) U.S. Cl.
CPC ....... *B29C 67/0051* (2013.01); *B29C 33/3842* (2013.01); *B29C 67/0055* (2013.01); *B29C 67/0059* (2013.01); *B29C 67/0092* (2013.01); *B29C 70/682* (2013.01); *B29C 70/688* (2013.01); *B29C 2033/385* (2013.01)

(58) Field of Classification Search
CPC ... B22D 23/00; B29C 33/56; B29C 33/3842; B29C 41/02; B29C 41/20; B29C 41/22; B29C 41/42; B29C 67/0051; B29C 67/0055; B29C 67/0059; B29C 67/0092; B29C 70/68; B29C 70/682; B29C 70/688; B29C 70/70; B29C 2033/385

USPC ......... 264/219, 255, 259, 279, 279.1, 297.1, 264/308, 334, 338; 164/15, 23, 24, 33, 47, 164/520
See application file for complete search history.

(56) References Cited

U.S. PATENT DOCUMENTS 6,262,223 B1 * 7/2001 Meador ................ C08G 73/101
524/600

* cited by examiner

*Primary Examiner* — Leo B Tentoni
(74) *Attorney, Agent, or Firm* — Ruder Ware, L.L.S.C.; Derek L. Prestin

(57) ABSTRACT

Example 3D printing methods involve rapid liquid filling of one or more cavities within a hollow and/or porous 3D printed object. In some examples, a conventional applicator computer-controllably dispenses significantly viscous solidifiable fluid in layers to build up a side wall of the object, and that same applicator or another applicator discharges a second solidifiable fluid at relatively low viscosity to rapidly fill the cavity(s), voids and/or porosity defined by the accurately printed side wall. In some examples, the liquid fill solidifies to permanently embed an internal object (e.g., wire or fiberglass mesh, Kevlar fabric, acrylic, bullet resistant armor, structural reinforcing material, etc.). In some examples, the liquid fill material permanently bonds to the accurately printed side wall. In some examples, the liquid fill material shrinks upon solidifying to create beneficial residual compressive stress within the 3D printed side wall and/or within the solidified material itself. In some examples, the liquid fill material does not solidify and is non-Newtonian to improve impact resistance.

22 Claims, 5 Drawing Sheets

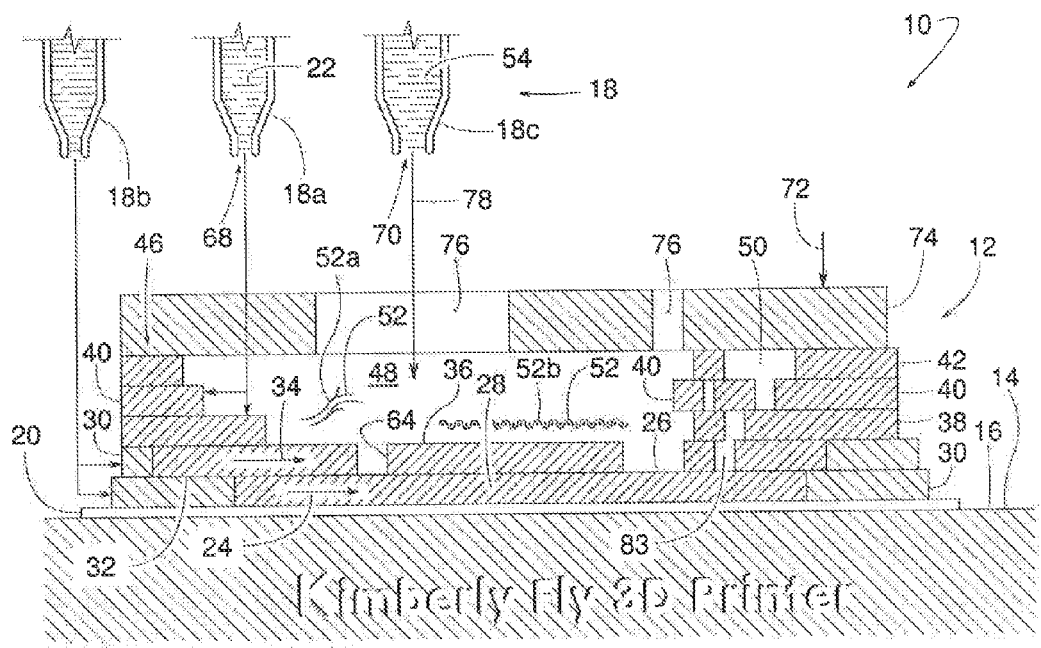
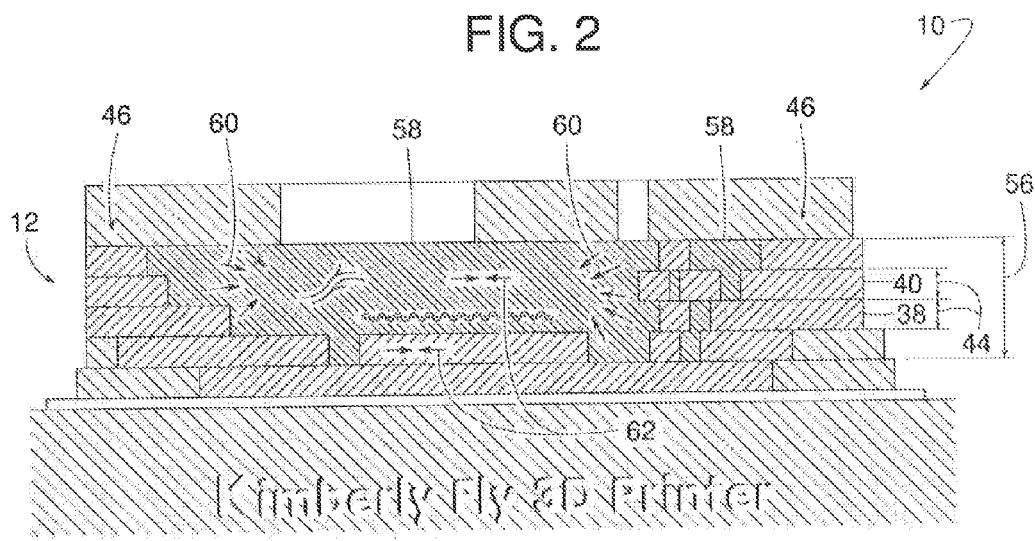

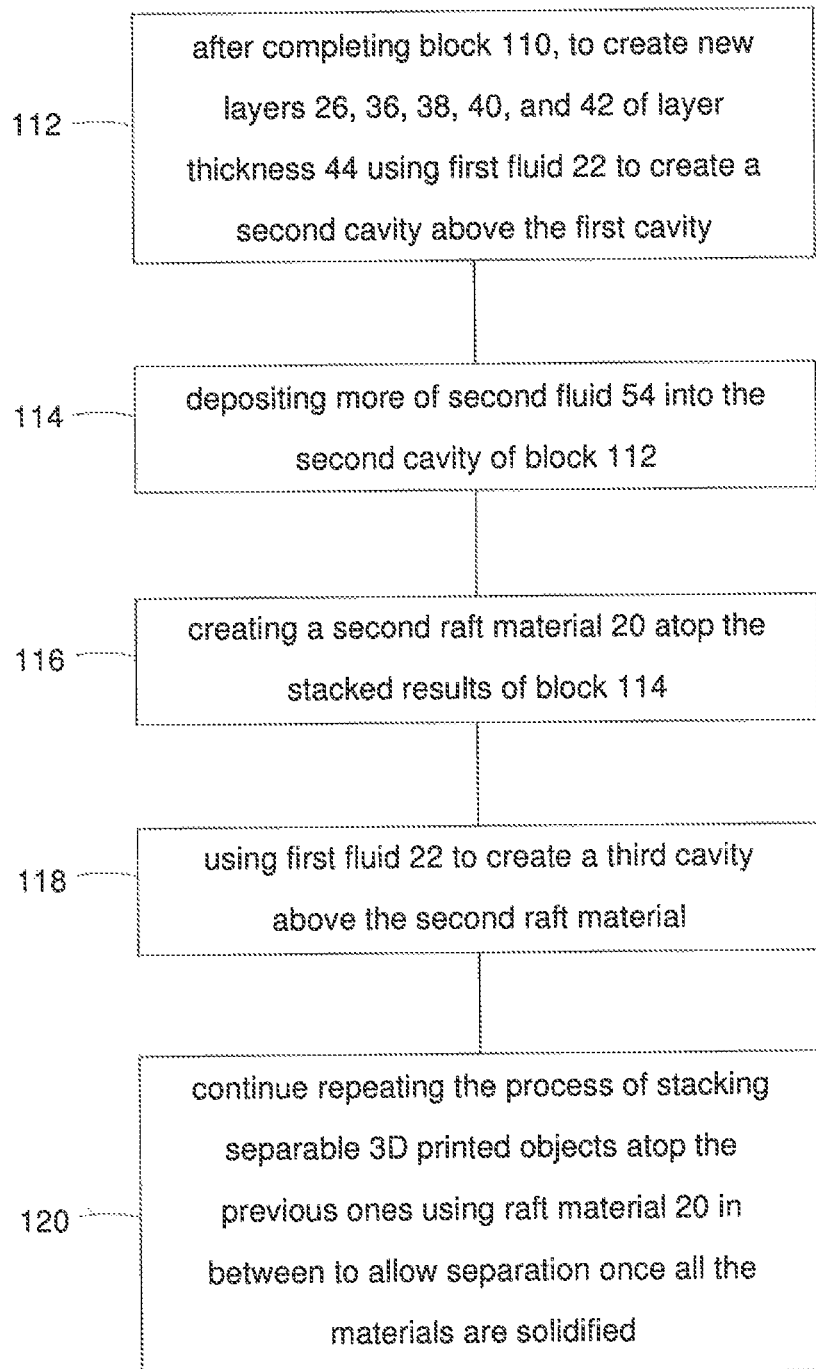

LAYERED 3D PRINTING WITH LOWER VISCOSITY FLUID FILL

FIELD OF THE DISCLOSURE

The present disclosure relates generally to additive manufacturing processes (3D printing) and more specifically to methods for reducing manufacturing cycle time and/or increasing the strength of additive manufactured products.

BACKGROUND

The terms, "3D printer" and 3D printing" refer to any machine or method used for processes known as additive manufacturing, rapid prototyping, laser sintering, fused deposition modeling, and steriolithrography, wherein a three-dimensional object, or at least part of it, is built up by sequential layering of material. Stratasys, Ltd. is just one example of a company that provides 3D printers. Although 3D printing is quite versatile, it can be relatively slow in producing large or detailed parts. Faster methods are advantageous.

BRIEF DESCRIPTION OF THE DRAWINGS

FIG. 1 is a cross-sectional side view of an example part being created by an example additive manufacturing method in accordance with the teachings disclosed herein.

FIG. 2 is a cross-sectional side view similar to FIG. 1 but showing another stage of the example additive manufacturing method.

FIG. 7 is a block diagram illustrating various methods associated with one or more of the examples shown in FIGS. 5 and 6.

DETAILED DESCRIPTION

Figure 3:
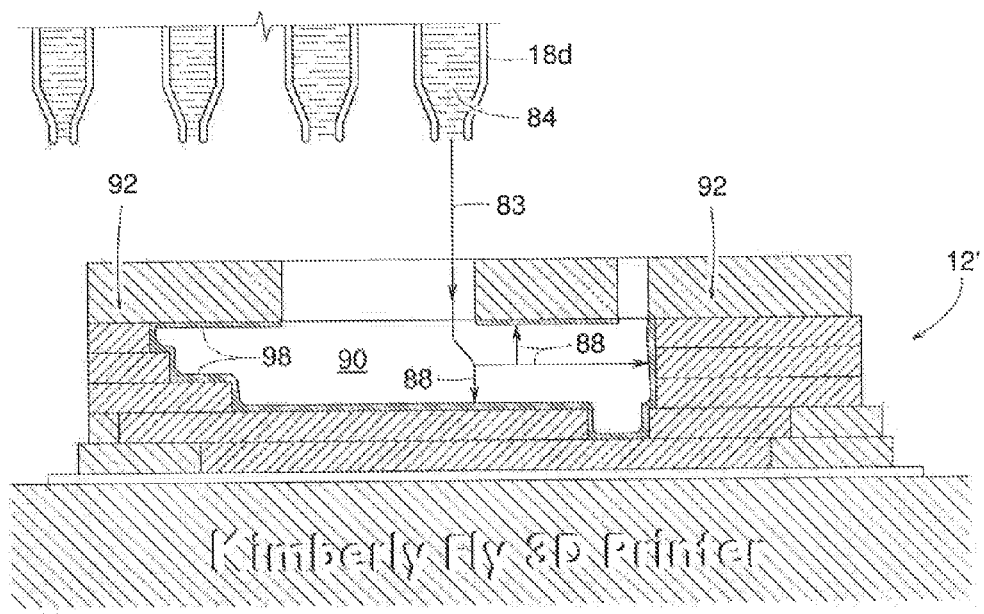
FIG. 3 is a cross-sectional side view of an example part being created by an example additive manufacturing method in accordance with the teachings disclosed herein.
Figure 4:
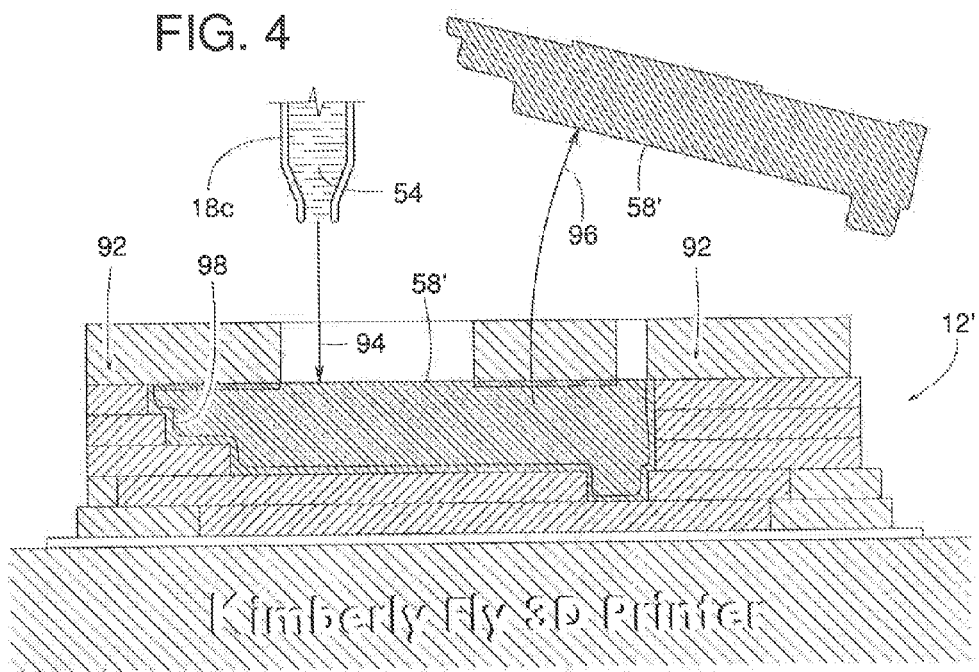
FIG. 4 is a cross-sectional side view similar to FIG. 3 but showing another stage of the example additive manufacturing method.

FIGS. 1-5 illustrate various procedures of an example additive manufacturing method 10 that involves dispensing a solidifiable fluid fill into the pores or into one or more other cavities of an additive manufactured object, such as object 12 of FIGS. 1 and 2 and object 12' of FIGS. 3 and 4. Examples of a cavity or cavities include, but are not limited to, a void, a gap, a hollow space, and/or inherent porosity. Method 10 provides various benefits including, but not limited to, shorter process cycle time, stronger parts, and the advantages of filling with a non-Newtonian fluid for use as armor.

Some examples of method 10 involve the use of a 3D printer 14 (e.g., Stratasys, Ltd.) comprising a build platform 16 and at least one applicator 18 (e.g., a first applicator 18a, a second applicator 18b, a third applicator 18c and/or a fourth applicator 18d). The term, "applicator" refers to any device for discharging a fluid that can later be solidified (e.g., solidified by raising or lowering its temperature, drying, setting, welding, freezing, chemical reaction, photochemical reaction, etc.). Depending on the chosen style of applicator, the fluid can be discharged in a desired flow pattern, examples of which include, but are not limited to, a narrow thread-like stream (fused deposition modeling or FDM), a ribbon-like stream, a broader fluid stream (e.g., manually discharged from a syringe, automatically discharged from a pump/valve apparatus, etc.), and discrete droplets (piezoelectric discharge).

Some examples of method 10 are performed according to the following sequence. On optional raft material 20 (e.g., glass, porous frangible material, adhesive tape, releasable coating) is placed upon or applied to build platform 16 of 3D printer 14. In some examples, raft material 20 is 3D printed by second applicator 18b depositing raft material 20 in a computer controlled layered manner. In some examples, raft material 20 is 3D printed by yet another applicator (e.g., a fifth applicator), other than applicator 18a, 18b, 18c or 18d. Raft material 20 can make it easier to release 3D printed object 12 from build platform 16, and later raft material 20 can be discarded. Applicator 18a is computer controlled to deposit a first fluid 22 in a first pass 24 (either directly on platform 16 or on optional raft material 20) to create a first layer 26 of a build material 28. Build material 28 is the solidified form of fluid 22.

The term, "fluid" refers to any material that can flow. Examples of a fluid include, but are not limited to, a liquid, molten material, and powder. More specific examples of first fluid 22 include, but are not limited to, thermoplastics, thermosetting plastic, resins, epoxy, other plastics, metal powder, ABS (acrylonitrile butadiene styrene), PET (polyethylene terephthalate), PLA (polylactic acid or thermoplastic aliphatic polyester), and polyetherimide.

Depending on the final shape of object 12, some examples of method 10 deposit a support material 30 to help support overhanging sections 32 of build material 28. In some examples, support material 30 is a prefabricated piece that is placed either upon raft material 20 or directly on build platform 16. In other examples, second applicator 18b builds support material 30 layer-by-layer in a manner similar to that of layering material 28. In some examples, support material 30 is water soluble or non-adhering to first layer 26 and is eventually removed from the finished object 12. In some examples, support material 30 is the same material as raft material 20.

After first layer 26 solidifies (partially or completely), applicator 18a is computer controlled to deposit first fluid 22 in a second pass 34 to create a second layer 36 of build material 28 on top of first layer 26. Second layer 36 is allowed to solidify, and the process is repeated sequentially for a plurality of layers such as a third layer 38, a fourth layer 40, a fifth layer 42, a sixth layer atop layer 42 or for as many layers necessary for creating object 12 with a desired shape. The so-called sixth layer is not shown but can be situated between fifth layer 42 and a cap 74, or the sixth layer could be laid as an alternative to installing cap 74. In some examples, each of layers 26, 36, 38, 40 and 42 and the sixth layer have a layer thickness 44 of about 0.010 inches or preferably within a range of about 0.003 to 0.020 inches. Although layers 26, 36, 38, 40 and 42 have been referred to as first, second, third, fourth and fifth layers, respectively, any two adjacent stacked layers can be referred to as first and second layers. For example, layer 38 can be referred to as a first layer, and layer 40 can be referred to as a second layer, even though layers 26 and 36 were laid prior to layers 38 and 40.

In the illustrated example, the vertical build up of layers 26, 36, 38, 40 and 42 produces a multilayer wall 46 (i.e., layered vertically as viewed in FIGS. 1-4) such that wall 46 defines a cavity 48, void 50 and/or inherent porosity 83. In some but not all examples, a solid object 52 (e.g., a carbon fiber 52a, a wire or fiberglass mesh 52b, Kevlar fabric, bullet resistant armor, electrical conductor, electrical component, electrical circuit, sensor, transducer, microprocessor, light bulb, light emitting diode, fabric, strain gage, etc.) is placed within cavity 48. In some but not all examples, object 52 is resistant to bullet penetration thereby making object 12 useful as armor in its finished state.

Next, regardless of whether cavity 48 is empty or contains object 52, applicator 18c deposits a second fluid 54 into cavity 48 such that a vertical depth 56 of second fluid 54 in cavity 48 is greater than layer thickness 44. If cavity 48 contains object 52, second fluid 54 completely submerges object 52 or at least submerges a part of object 52. Depth 56 being greater than the vertical thickness of multiple layers enables rapid filling of cavity 48 and/or provides the finished product with various structural advantages. After depositing second fluid 54 into cavity 48, second fluid 54 solidifies to create a solidified fill material 58 within cavity 48. In some examples, object 52 becomes embedded within solidified fill material 58, as shown in FIG. 2. Some examples of second fluid 54 include, but are not limited to, thermoplastics, thermosetting plastic, acrylic, resins, epoxy, other plastics, wax, adhesive, dyes, ceramic, plaster (e.g., plaster of Paris), metal powder, liquid metal, liquid resin impregnated with solid powder or fibers, ABS (acrylonitrile butadiene styrene), PET (polyethylene terephthalate), PLA (polylactic acid or thermoplastic aliphatic polyester), polyetherimide, chocolate, butter, cheese, water, gelatin, juice, yogurt, liquid sugar, liquid polymers, etc.

In some examples, the 3-D printed object and method just described include various features and advantages. For instance, in some cases, second fluid 54 permanently bonds to multilayer wall 46, cavity 48, void 50, porosity 83, and/or edges 64 to comprise a portion of object 12 once all fluids are solidified.

In some examples, the 3-D printed object and method just described include various features and advantages. For instance, in some cases, second fluid 54 bonding to wall 46 and shrinking upon solidifying produces a residual compressive stress 62 within object 12 (e.g., within wall 46 and/or within solidified fill material 58 itself). The residual compressive stress 62, in some examples, increases the strength and load carrying capacity of object 12. In addition or as an alternative to second fluid 54 bonding to wall 46, some examples of method 10 have solidified fill material 58 and/or object 52 mechanically engaging or interlocking with certain 3D printed edges 64 of object 12.

In some examples, object 52 can increase the strength of object 12 regardless of any residual compressive stress. In some examples, object 52 mechanically engages, mates or interlocks with 3D printed object 12 to assist in proper placement of object 52 within cavity 48 and/or to improve the structural integrity of 3D printed object 12.

In some examples, first applicator 18a carefully and controllably deposits first fluid 22 at a desired first viscosity, at a first mass flow rate, and in rather thin layers (e.g., 0.003 to 0.020 inches thick) to achieve dimensional accuracy of 3D printed object 12. Later or alternatively, second fluid 54 is injected into cavity 48 at a lower second viscosity and at a higher second mass flow rate. The term, "mass flow rate" refers to the average mass flow rate while the fluid is being deposited or dispensed. In some examples, third applicator 18c simply pours or pumps second fluid 54 into cavity 48 without the need for accurately locating applicator 18c or necessarily following any particular layering technique. In some examples, third applicator 18c is a manually operated syringe or a power operated pump or valve arrangement. In some examples, applicator 18c discharges second fluid 54 along multiple passes, but in such examples, a second pass is laid without having to wait for a previous pass to harden. In some examples, the first and second fluids 22 and 54 are comprised of the same material, and the viscosity of second fluid 54 is less than that of first fluid 22 by virtue of second fluid 54 being at a higher temperature. In some examples, first applicator 18a is used for dispensing both fluids 22 and 54. In some examples, the first and second fluids 22 and 54 are comprised of different materials, and the viscosity of second fluid 54 is less than first fluid 22 by virtue of their different material properties. In some examples, only first fluid 22 or second fluid 54 is of a thermoplastic material to achieve desired material properties and dispensing characteristics.

To accurately build up multilayer wall 46 in a controlled manner and then filling cavity 48, void 50 and/or porosity 83 at a much faster rate, some example methods discharge first fluid 22 through a first discharge opening 68 and discharge second fluid 54 through a significantly larger second discharge opening 70. In the illustrated example, first applicator 18a provides first discharge opening 68, and third applicator 18c provides second discharge opening 70. The difference in discharge opening size is just one example of how applicators 18a and 18c are each of a construction that is physically distinguishable from each other. Other examples of physical distinctions include, but are not limited to, physical size, mode of fluid discharge, type or shape of nozzle, etc. In some examples, the rapid fill of cavity 48 allows the solidified fill material 58 to be of a much greater volume (second volume) than the combined volumes of the first and second layers 38 and 40 (combined first volume) while maintaining a reasonable process cycle time even in examples where solidifying second fluid 54 in cavity 48 consumes more time than solidifying first fluid 22 in second pass 40.

In some cases, it can be difficult or impossible to 3D print a layer over a liquid or over open space, so some examples of method 10 include manually or otherwise installing 72 cap 74 atop the plurality of 3D printed layers (on top of layer 42 or on top of the sixth layer) to extend over cavity 48. In some examples, cap 74 includes one or more openings 76 for dispensing or depositing 78 second fluid 54 into cavity 48 after cap 74 is installed. Some openings 76 can be used for venting gas displaced by second fluid 54 entering cavity 48. In some examples, second fluid 54 within cavity 48, void 50 or pores 83 is allowed to solidify and another first layer 26 is dispensed atop the solidified fluid (solidified fill material 58).

FIGS. 3 and 4 show an example method of using this present invention for creating a casting 58'. FIG. 3 represents fluid 84 being dispensed 82 (e.g., via fourth applicator 18d) and broadcast 88 by pressure, vibration or centrifugal force to create coating 98 inside cavity 90 defined by a multilayer wall 92 of additive manufactured object 12' (in this example, object 12' is a mold). Arrow 94 of FIG. 4 represents depositing second fluid 54 into the coated cavity, and arrow 96 of FIG. 4 represents separating solidified fill material 58 (solidified form of fluid 54) from coating 98. In some examples, coating 98 is a ceramic material, and solidified fill material 58 is a metal dispensed originally as a molten metal.

Figure 5:
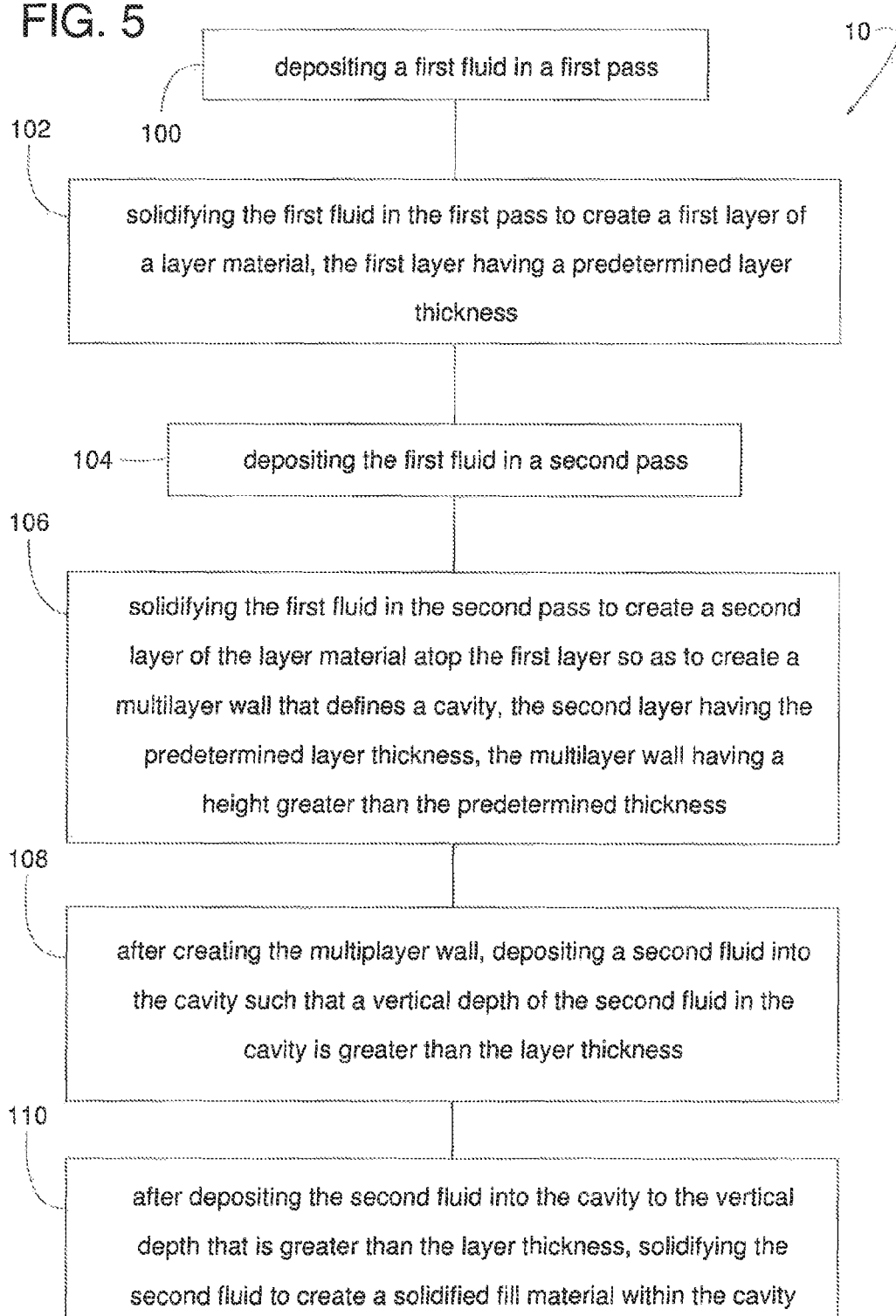
FIG. 5 is a block diagram illustrating various methods associated with one or more of the examples shown in FIGS. 1-4.

In some examples, additive manufacturing method 10 is carried out as shown in FIG. 5. In this example, block 100 represents depositing first fluid 22 in first pass 38. Block 102 represents solidifying first fluid 22 in a first pass to create first layer 38 of build material 28, wherein first layer 38 has predetermined layer thickness 44. Block 104 represents depositing first fluid 22 in a second pass. Block 106 represents solidifying first fluid 22 in the second pass to create second layer 40 of build material 28 atop first layer 38 so as to create multilayer wall 46 that defines cavity 48, wherein second layer 40 has is of the predetermined layer thickness 44, and multilayer wall 46 has height 56 being greater than predetermined thickness 44. Block 108 represents after creating multiplayer wall 46, depositing second fluid 54 into cavity 48 such that vertical depth 56 of second fluid 54 in cavity 48 is greater than layer thickness 44. Block 110 represents after depositing second liquid 54 into cavity 48 to vertical depth 56, solidifying second liquid 54 to create solidified fill material 58 within cavity 48.

Figure 6:
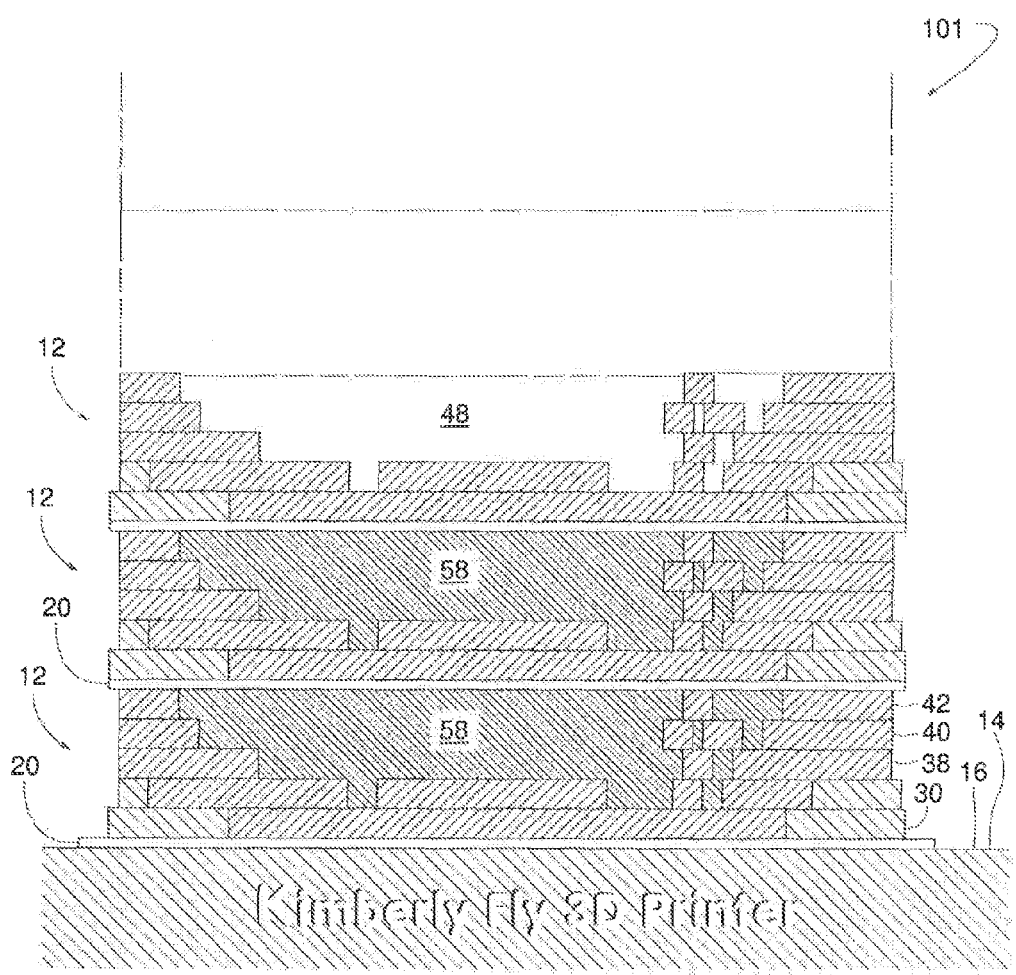
FIG. 6 is a cross-sectional side view of an example part being created by an example additive manufacturing method in accordance with the teachings disclosed herein.

In some examples, multiple objects 4 are 3D printed in a stack to create one larger object 101, as shown in FIG. 6. In this example, cap 74 is omitted, and raft material 20 is optional. Including raft material 20 allows larger object 101 to be readily separated into a plurality of individual objects 12. In some examples, raft material 20 is comprised of support material 30 which may be water soluable. However, if raft material 20 is omitted, larger object 101 can remain as one cohesive product comprising multiple integral objects 12.

FIG. 7 is an example diagram illustrating a method for producing object 101, wherein block 112 represents after completing block 110, to create new layers 26, 36, 38, 40, and 42 (and optionally one or more additional layers, such as a sixth layer as an alternative to cap 74) of layer thickness 44 using first fluid 22, thereby creating a second cavity above the first cavity. Block 114 represents after completing block 112, to deposit more of second fluid 54 into second cavity of block 112. Block 116 represents after completing block 114, to create a second raft material 20 atop the stacked results of block 114. Block 118 represents after completing block 116, to create new layers 26, 36, 38, 40, and 42 (and optionally one or more additional layers, such as a sixth layer as an alternative to cap 74) of layer thickness 44 using first fluid 22, thereby creating a third cavity above the second raft material. Block 120 represents after completing block 118, to continue repeating this process of stacking separable 3D printed objects atop the previous ones, using raft material 20 in between to allow separation once all the materials are solidified.

Although certain example methods, apparatus and articles of manufacture have been described herein, the scope of the coverage of this patent is not limited thereto. Rather, this patent covers all methods, apparatus and articles of manufacture fairly falling within the scope of the appended claims either literally or under the doctrine of equivalents.

The invention claimed is:

1. An additive manufacturing method, comprising:
    depositing a first fluid in a first pass;
    solidifying the first fluid in the first pass to create a first layer of a build material, the first layer having a predetermined layer thickness;
    depositing the first fluid in a second pass;
    solidifying the first fluid in the second pass to create a second layer of the build material atop the first layer so as to create a multilayer wall that defines a cavity, the second layer having the predetermined layer thickness, the multilayer wall having a height greater than the predetermined thickness;
    after creating the multilayer wall, depositing a second fluid into the cavity such that a vertical depth of the second fluid in the cavity is greater than the layer thickness; and
    after depositing the second fluid into the cavity to the vertical depth that is greater than the layer thickness, solidifying the second fluid to create a solidified fill material within the cavity.

2. The additive manufacturing method of claim 1, wherein the time required to fill the cavity with the second fluid is less than the amount of time required had the cavity been filled with the first fluid.

3. The additive manufacturing method of claim 1, wherein the first fluid has a first viscosity while depositing the first fluid in the second pass, the second fluid has a second viscosity while depositing the second fluid into the cavity, and the second viscosity is less than the first viscosity.

4. The additive manufacturing method of claim 1, wherein the first fluid flows at a first mass flow rate while depositing the first fluid in the second pass, the second fluid flows at a second mass flow rate while depositing the second fluid into the cavity, and the second mass flow rate is greater than the first mass flow rate.

5. The additive manufacturing method of claim 1, wherein the first fluid flows through a first discharge opening while depositing the first fluid in the second pass, the second fluid flows through a second discharge opening while depositing the second fluid into the cavity, and the second discharge opening is larger than the first discharge opening.

6. The additive manufacturing method of claim 1, wherein a first applicator is used for depositing the first fluid in the second pass and a second applicator is used for depositing the second fluid into the cavity.

7. The additive manufacturing method of claim 1, wherein the first layer and the second layer are part of a plurality of layers, and the additive manufacturing method further comprising:
    installing a cap atop the plurality of layers such that the cap overlies the cavity; and
    depositing the second fluid into the cavity after installing the cap.

8. The additive manufacturing method of claim 1, further comprising:
    the second fluid shrinking upon solidifying within the cavity;
    after depositing the second fluid into the cavity, the solidified fill material subjecting at least one of the multilayer wall and the solidified fill material to a residual compressive stress.

9. The additive manufacturing method of claim 1, further comprising:
    having a solid object disposed within the cavity;
    the second fluid submerging at least a part of the solid object such that the part becomes embedded within the solidified fill material.

10. The additive manufacturing method of claim 1, further comprising:
    prior to depositing the second fluid into the cavity, coating the multilayer wall with a ceramic material;
    after coating the multilayer wall with the ceramic material, depositing the second fluid into the cavity, wherein the second fluid is a molten metal.

11. The additive manufacturing method of claim 10, further comprising separating the solidified fill material from the ceramic material.

12. The additive manufacturing method of claim 1 further comprising:
   producing a first object comprising the first multilayer wall and the first solidified fill material; and
   creating a plurality of stacked objects by building a second object atop the first object, wherein the second object is substantially similar to the first object.

13. The additive manufacturing method of claim 12, further comprising separating the plurality of stacked objects.

14. An additive manufacturing method, comprising:
   using a first applicator for depositing a first fluid in a first pass;
   solidifying the first fluid in the first pass to create a first layer of a build material, the first layer having a predetermined layer thickness;
   using the first applicator for depositing the first fluid in a second pass, the first fluid being at a first viscosity and flowing at a first mass flow rate upon being discharged from the first applicator;
   solidifying the first fluid in the second pass to create a second layer of the build material atop the first layer so as to create a multilayer wall that defines a cavity, the second layer having the predetermined layer thickness, the multilayer wall having a height greater than the predetermined thickness;
   after creating the multilayer wall, using a second applicator for depositing a second fluid into the cavity such that a vertical depth of the second fluid in the cavity is greater than the layer thickness, the second fluid being at a second viscosity and flowing at a second mass flow rate upon being discharged from the second applicator, the second viscosity being less than the first viscosity, the second mass flow rate being greater than the first mass flow rate; and
   after depositing the second fluid into the cavity to the vertical depth that is greater than the layer thickness, solidifying the second fluid to create a solidified fill material within the cavity, wherein solidifying the second fluid in the cavity consumes more time than solidifying the first fluid in the second pass.

15. The additive manufacturing method of claim 14, further comprising:
   having a solid object disposed within the cavity;
   the second fluid submerging at least a part of the solid object such that the part becomes embedded within the solidified fill material.

16. The additive manufacturing method of claim 15, wherein the solid object comprises wire.

17. The additive manufacturing method of claim 15, wherein the solid object comprises wire mesh.

18. The additive manufacturing method of claim 15, wherein the solid object comprises carbon fibers.

19. The additive manufacturing method of claim 15, wherein the solid object comprises glass fibers.

20. The additive manufacturing method of claim 15, wherein the solid object comprises aramid fibers that are resistant to high impacts.

21. An additive manufacturing method, comprising:
   using a first applicator for depositing a first fluid in a first pass;
   solidifying the first fluid in the first pass to create a first layer of a build material, the first layer having a predetermined layer thickness;
   using the first applicator for depositing the first fluid in a second pass, the first fluid being at a first viscosity and flowing at a first mass flow rate upon being discharged through a first opening of the first applicator;
   solidifying the first fluid in the second pass to create a second layer of the build material atop the first layer so as to create a multilayer wall that defines a cavity, the second layer having the predetermined layer thickness, the multilayer wall having a height greater than the predetermined thickness;
   after creating the multilayer wall, using a second applicator for depositing a second fluid into the cavity such that a vertical depth of the second fluid in the cavity is greater than the layer thickness, the second fluid being at a second viscosity and flowing at a second mass flow rate upon being discharged through a second opening of the second applicator, the second opening being larger than the first opening, the second viscosity being less than the first viscosity, the second mass flow rate being greater than the first mass flow rate;
   after depositing the second fluid into the cavity to the vertical depth that is greater than the layer thickness, solidifying the second fluid to create a solidified fill material within the cavity, wherein solidifying the second fluid in the cavity consumes more time than solidifying the first fluid in the second pass; and
   after depositing the second fluid into the cavity, the solidified fill material subjecting at least one of the multilayer wall and the solidified fill material to a residual compressive stress.

22. The additive manufacturing method of claim 21, wherein the deposited second fluid is a non-Newtonian fluid.

* * * * *